US012639956B2

(12) United States Patent
Lee et al.

(10) Patent No.: US 12,639,956 B2
(45) Date of Patent: May 26, 2026

(54) METHOD FOR IDENTIFYING MOVING VEHICLES AND IN-VEHICLE DEVICE

(71) Applicant: HON HAI PRECISION INDUSTRY CO., LTD., New Taipei (TW)

(72) Inventors: Chieh Lee, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 530 days.

(21) Appl. No.: 18/095,954

(22) Filed: Jan. 11, 2023

(65) Prior Publication Data

US 2023/0394843 A1     Dec. 7, 2023

(30) Foreign Application Priority Data

Jun. 7, 2022     (CN) .......................... 202210641866.5

(51) Int. Cl.
*G06V 20/58*          (2022.01)
*B60W 50/14*          (2020.01)
(Continued)

(52) U.S. Cl.
CPC ............. *G06V 20/58* (2022.01); *B60W 50/14* (2013.01); *G06V 10/44* (2022.01); *G06V 10/764* (2022.01); *B60W 2050/143* (2013.01)

(58) Field of Classification Search
CPC ...... G06V 20/58; G06V 10/44; G06V 10/764; B60W 50/14; B60W 2050/143
See application file for complete search history.

(56) References Cited

U.S. PATENT DOCUMENTS

| | | | | |
|---|---|---|---|---|
| 10,902,279 | B2 * | 1/2021 | Tawari | ................. G06V 10/774 |
| 2019/0130583 | A1 * | 5/2019 | Chen | ....................... G06T 7/194 |

(Continued)

FOREIGN PATENT DOCUMENTS

| | | | |
|---|---|---|---|
| CN | 102768359 | A  * | 11/2012 |
| CN | 113734120 | | 12/2021 |

(Continued)

OTHER PUBLICATIONS

Zhang et al.; "A Traffic Surveillance System for Obtaining Comprehensive Information of the Passing Vehicles Based on Instance Segmentation"; IEEE, Nov. 2021.*

(Continued)

*Primary Examiner* — Shaghayegh Azima
(74) *Attorney, Agent, or Firm* — ScienBiziP, P.C.

(57) ABSTRACT

A method for identifying road vehicles or other objects which are in motion against those which are not moving applied in an in-vehicle device of an assisted vehicle which is being driven shoots a first image of a target vehicle and a second later image of the target vehicle, determines a first mask area of the target vehicle from the first image, and determines a second mask of the target vehicle from the second image based on an instance segmentation algorithm. An Intersection over Union (IoU) is calculated between the first mask area and the second mask area and a determination made as to whether a dynamic class object mask area of the target vehicle according to the IoU should be generated. A dynamic class object mask area of the target vehicle is generated when the target vehicle is found to be a moving vehicle.

20 Claims, 4 Drawing Sheets

Capturing a first image of a target vehicle at a first time and a second image of the target vehicle at a second time — 21

Determining a first mask area of the target vehicle from the first image, and determining a second mask of the target vehicle from the second image based on an instance segmentation algorithm — 22

Calculating an Intersection over Union (IoU) between the first mask area and the second mask area — 23

Determining whether to generate a dynamic class object mask area of the target vehicle according to the IoU — 24

Determining that the target vehicle is a moving vehicle when generating the dynamic class object mask area of the target vehicle — 25

(51) Int. Cl.
  G06V 10/44   (2022.01)
  G06V 10/764  (2022.01)

(56)     References Cited

U.S. PATENT DOCUMENTS

| | | | |
|---|---|---|---|
| 2019/0291728 A1* | 9/2019 | Shalev-Shwartz ........................... B60W 30/0956 | |
| 2020/0097754 A1* | 3/2020 | Tawari ................. G06N 3/0442 | |
| 2020/0377105 A1* | 12/2020 | Murashkin ............. G06N 3/044 | |
| 2022/0198677 A1* | 6/2022 | Bisain ..................... G06T 7/174 | |
| 2026/0017925 A1* | 1/2026 | Wei ...................... G06V 10/255 | |

FOREIGN PATENT DOCUMENTS

| | | | | |
|---|---|---|---|---|
| CN | 113734120 A | * | 12/2021 | ............... B60T 7/22 |
| CN | 114419008 | | 4/2022 | |
| JP | 3590687 B2 | * | 11/2004 | |
| TW | 201116431 | | 5/2011 | |
| TW | 202013248 | | 4/2020 | |

OTHER PUBLICATIONS

Ballester, Irene, et al. "DOT: Dynamic object tracking for visual SLAM." 2021 IEEE international conference on robotics and automation (ICRA). IEEE, 2021. (Year: 2021).*

* cited by examiner

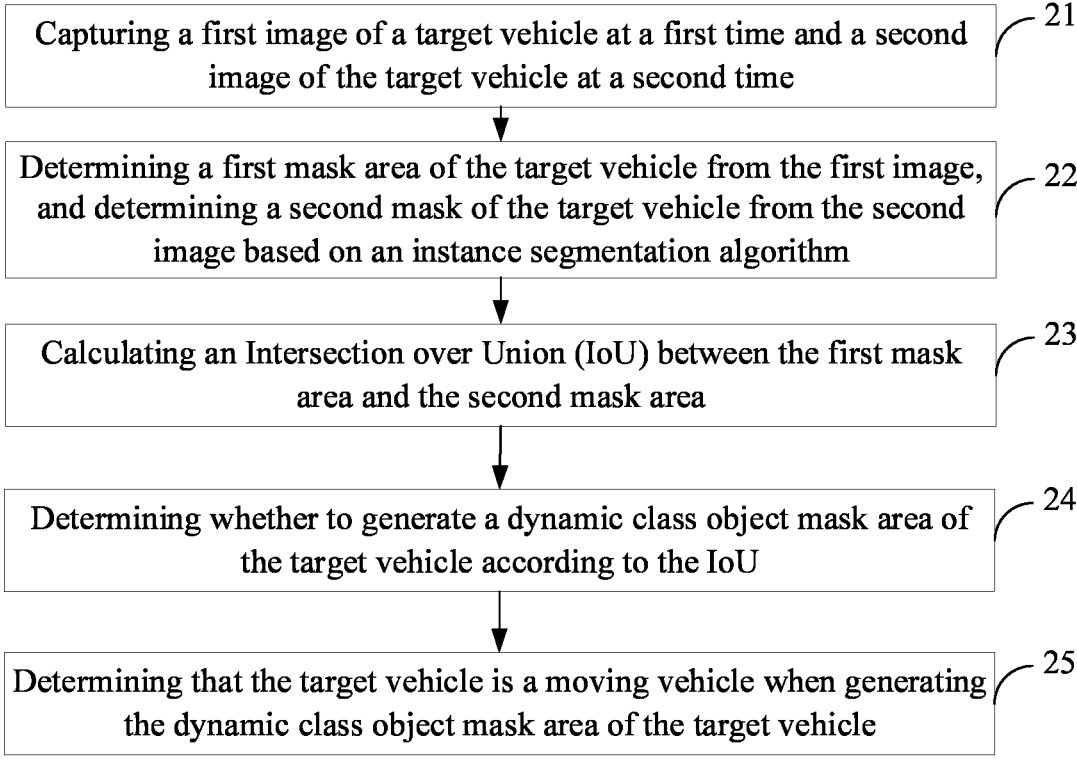

Capturing a first image of a target vehicle at a first time and a second image of the target vehicle at a second time ⌐ 21

Determining a first mask area of the target vehicle from the first image, and determining a second mask of the target vehicle from the second image based on an instance segmentation algorithm ⌐ 22

Calculating an Intersection over Union (IoU) between the first mask area and the second mask area ⌐ 23

Determining whether to generate a dynamic class object mask area of the target vehicle according to the IoU ⌐ 24

Determining that the target vehicle is a moving vehicle when generating the dynamic class object mask area of the target vehicle ⌐ 25

FIG.2

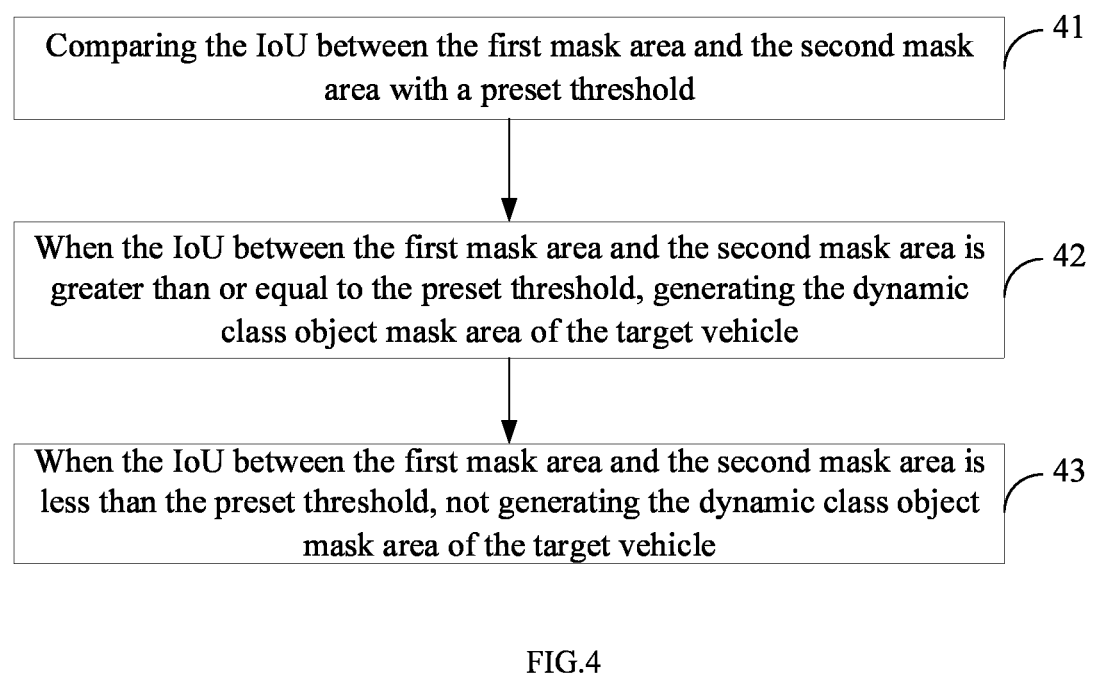

Comparing the IoU between the first mask area and the second mask area with a preset threshold    41

When the IoU between the first mask area and the second mask area is greater than or equal to the preset threshold, generating the dynamic class object mask area of the target vehicle    42

When the IoU between the first mask area and the second mask area is less than the preset threshold, not generating the dynamic class object mask area of the target vehicle    43

FIG.4

METHOD FOR IDENTIFYING MOVING VEHICLES AND IN-VEHICLE DEVICE

This application claims priority to Chinese Patent Application No. 202210641866.5 filed on Jun. 7, 2022, in China National Intellectual Property Administration, the contents of which are incorporated by reference herein.

FIELD

The subject matter herein generally relates to a field of object detection, in particular, relates to a method for identifying moving vehicles and an in-vehicle device.

BACKGROUND

In a process of driving, a driver needs to make a correct judgment on the surrounding environment and perceive moving objects around the vehicle to prevent traffic accidents. The objects in the images can be identified by performing image processing on the images, for example, using semantic segmentation of image segmentation to identify and classify objects around the vehicle, assigning a category to each pixel in the images, vehicles and pedestrians are two such categories for example. However, the above methods cannot distinguish different objects in the same category (for example, vehicles) from the images, which may easily cause a wrong identification of stationary vehicles as being in motion, which affects an accuracy of identifying the moving vehicles.

BRIEF DESCRIPTION OF THE DRAWINGS

Implementations of the present disclosure will now be described, by way of embodiment, with reference to the attached figures.

FIG. 2 is a flowchart of one embodiment of a method for identifying moving vehicles according to the present disclosure.

FIG. 4 is a flowchart of one embodiment of generating a dynamic class object mask area of the target vehicle.

DETAILED DESCRIPTION

Figure 1:
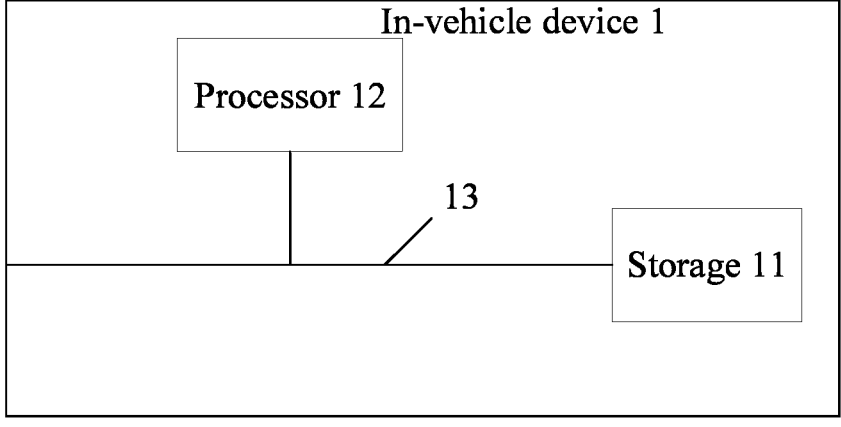
FIG. 1 is a schematic diagram of one embodiment of an in-vehicle device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

FIG. 1 illustrates the in-vehicle device 1. The in-vehicle device 1 includes, but is not limited to, a storage 11 and at least one processor 12. The storage 11 connects to the processor 12 by a communication bus 13 or is directly connected. In one embodiment, the in-vehicle device 1 is provided on a vehicle ("the assisted vehicle"), and the in-vehicle device 1 may be an in-vehicle computer. In one embodiments, the in-vehicle device 1 includes a camera, and the camera is used to capture images or videos of the scene around the assisted vehicle. In one embodiment, the in-vehicle device 1 may also not include a camera but it may establish a communication connection with one or more cameras inside the assisted vehicle, so as to obtain the images or videos directly from the camera in the vehicle. In one embodiment, the in-vehicle device 1 can also be connected to a driving recorder in the assisted vehicle, and can obtain the images or videos from the driving recorder.

Those skilled in the art should understand that the structure of the in-vehicle device 1 shown in FIG. 1 does not constitute a limitation of the embodiments of the present invention, and the in-vehicle device 1 may further include more or less hardware or software than that shown in FIG. 1, or have different component arrangements.

The processor 12 in the in-vehicle device 1 can implement a method for identifying moving vehicles that will be described in detail below when executing computer programs, and the computer programs include identifying programs for identifying moving vehicles.

In a process of driving a vehicle, the vehicle needs to make a correct judgment on the surrounding environment and perceive objects which are in motion around the vehicle to prevent traffic accidents. The objects in the images can be identified by performing image processing on the images, for example, using semantic segmentation of image segmentation to identify and classify objects around the vehicle, assigning a category to each pixel in the images, for example, vehicles and pedestrians are two such categories. However, the above methods cannot distinguish different objects in the same category (for example, vehicles) from the images, which may easily cause to wrongly identify non-moving vehicles as moving vehicles when identifying the moving vehicles, which affects an accuracy of identifying the moving vehicles.

In order to solve the above technical problems, the embodiments of the present application provide a method for identifying moving vehicles. FIG. 2 illustrates the method for identifying moving vehicles. The method is applied in the in-vehicle device 1, which can improve an accuracy of identifying moving vehicles and ensure a safety of vehicles. The method is provided by way of example, as there are a variety of ways to carry out the method. Each block shown in FIG. 2 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 21.

At block 21, a first image of a target vehicle at a first time and a second image of the target vehicle at a second time are captured.

In one embodiment, a camera of the assisted vehicle (egg, a monocular camera) is used to shoot images at different moments around the assisted vehicle. In one embodiment, images containing multiple target objects can be captured, and the target objects can be objects of different categories, such as target vehicles or people. In one embodiment, when two images are captured at consecutive moments including first time and second time, one of the two images shot at the first time is used as the first image, the other image shot at the second time is used as the second image. Taking a target vehicle as an example, the first image is obtained by shooting the target vehicle at the first time, and the second image is obtained by shooting the target vehicle at the second time.

When capturing the images of the scene outside the assisted vehicle by a shooting device, an RGB image of the images is taken as a single image, the first image at the first time and the second image at the second time are obtained respectively. In one embodiment two consecutive images $I_t$ and $I_{t+1}$ in one scene are acquired, $I_t$ representing the first image at time t (i.e., the first time), and $I_{t+1}$ representing the second image at time (t+1) (i.e., the second time).

At block 22, a first mask area of the target vehicle is determined from the first image, and a second mask of the target vehicle is determined from the second image based on an instance segmentation algorithm.

In one embodiment, the instance segmentation algorithm not only has characteristics of semantic segmentation, but also has the characteristics of detecting target objects. The instance segmentation algorithm can apply classifications at a pixel level and can track and locate one object within and through non-simultaneous images. In one embodiment, the instance segmentation algorithm can distinguish objects of the same category as a single target object, and classify the target object as a vehicle and locate a position of the vehicle. In one embodiment, the instance segmentation algorithm distinguishes identified vehicles, and can treat each vehicle of the identified vehicles as a separate object within several images of different times, and one or more of the separate objects is a target vehicle.

In one embodiment, a mask, also known as masking, means that the processable image (in part or all) is occluded with a selected image, a figure or an object, thereby controlling an area or a process of the image. For example, when an object in the image to be processed is obscured, an obscured area of the image is called a masked area or a mask. In one embodiment, each identified target vehicle is processed with a different mask to distinguish between different target vehicles in the same image.

In one embodiment, the first image and the second image are respectively input into a feature extraction network to obtain feature maps, specifically, the first image is input into the feature extraction network to obtain the first feature map of the first image, and the second image is input into the feature extraction network to obtain the second feature map of the second image. The first image at time t and the second image at time (t+1) are used as input images for a monocular depth estimation residual convolutional neural network model, and the monocular depth estimation residual convolutional neural network model includes an input layer, seven layers of convolution layers, seven layers of deconvolution layers, and four residual items. In one embodiment, the first image at time t undergoes convolution operation by the residual convolutional neural network model of monocular depth estimation and the first feature map corresponding to the first image is obtained. The second image at time (t+1) undergoes convolution operation by the residual convolutional neural network model of monocular depth estimation and the first feature map corresponding to the second image is obtained.

In one embodiment, the method includes: performing binary classification and coordinate regression on the first feature map and the second feature map, and determining whether the first feature map has first Regions of Interest (ROIs) of the target vehicle, and determining whether the second feature map has second ROIs of the target vehicle.

In one embodiment, after one convolutional layer outputs the first feature map, each pixel in the first feature map is mapped to a corresponding depth value by a depth linear regression function. Then, a fixed number (default 15) of the first regions of interest are set for the pixels in the first feature map, and the first regions of interest are input into a Region Proposal Network (RPN) for Binary classification and coordinate regression to obtain the first region of interest showing the target vehicle. The second region of interest of the second feature map is obtained by the same method as that used to obtain the first region of interest. After obtaining the first region of interest and the second region of interest, the first feature submaps are extracted from each first region of interest by using the regional feature aggregation method (ROIAlign), and the first feature submaps are classified. The classified first feature submaps form a candidate frame regression, and the first mask area is generated by a fully convolutional network (FCN). Similarly, the second feature submaps are extracted from each second region of interest by using the regional feature aggregation method, and the second feature submaps are classified, the classified second feature submaps form the candidate frame regression, and the second mask area is generated by the FCN.

In one embodiment, an ROI-Pooling can be used to convert the ROIs of different sizes into the ROIs having fixed size, but in a process of conversion, two rounding operations and a quantization operation are required, resulting in a major deviation in the ROI of a feature space, which will affect an accuracy of image segmentation. In one embodiment, by using ROIAlign proposed on the basis of ROI-Pooling, a problem of inaccurate regions after segmentation is solved. In one embodiment, ROIAlign cancels the rounding operation, retains all floating-point numbers, then obtains the value of sampling points by a bilinear interpolation method, and then pools a maximum value of the sampling points to obtain a final value, thus improving the accuracy of the detection model.

In one embodiment, before generating the first mask area, the instance segmentation algorithm can also be used to obtain a first position of the target vehicle in the first image and an identification of the target vehicle, the identification being the mark of each vehicle. When the identification of the target vehicle obtained at the first time and the second image is obtained at the second time, a position of the target vehicle in the second image is determined, and then the target vehicle in the second image is segmented by using the instance segmentation algorithm, and the second mask area of the second position is generated.

At block 23, an Intersection over Union (IoU) between the first mask area and the second mask area is calculated.

In one embodiment, a calculation by the IoU describes a degree of coincidence between the first mask area at the first position and the second mask area at the second position in a same scene. In one embodiment, the method includes: calculating a first coincidence degree between the first mask area and the second mask area, and a second coincidence degree between the first mask area and the second mask area. For example, for the target vehicle in the same scene, based on the first mask area of the target vehicle at the first position at time t and the second mask area of the target vehicle at the second position at time (t+1), a degree of movement of position/degree of displacement of the target vehicle is calculated.

Figure 3:
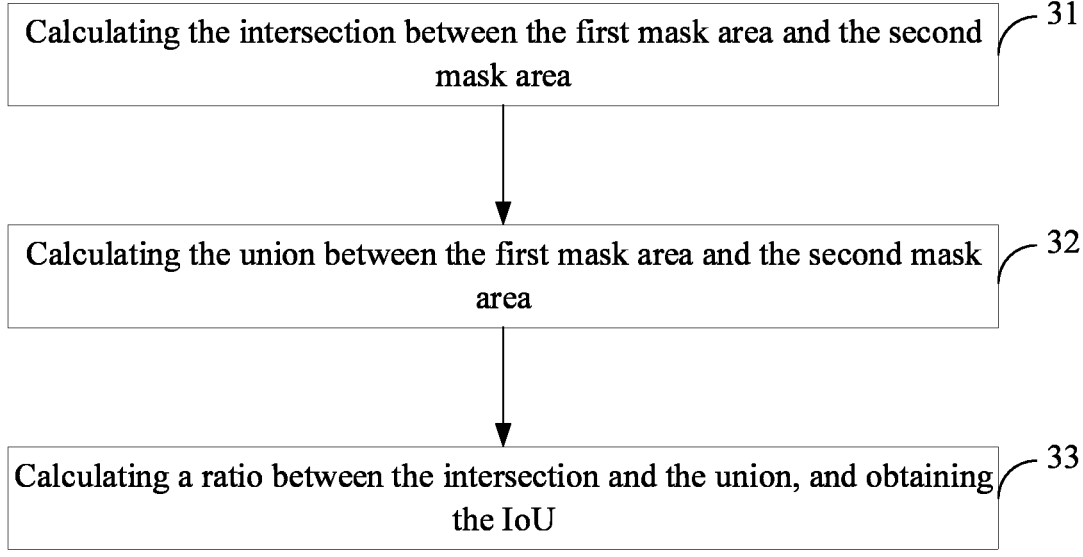
FIG. 3 is a flowchart of one embodiment of calculating an Intersection over Union of a target vehicle at different times.

FIG. 3 illustrates a method of calculating the IoU of the target vehicles at different times. The coincidence degree between the first mask area and the second mask area includes an intersection (e.g. the first coincidence degree) of the first mask and area the second mask area and a union (e.g. the second coincidence degree) of the first mask area and the second mask area. The method of calculating the IoU of the target vehicles at different times can begin at block 31. At block 31, the intersection between the first mask area and the second mask area is calculated.

In one embodiment, the first mask area at the first position and the second mask area at the second position are regarded as areas of a pixel set, and the intersection between the area of the pixel set representing the first mask and the pixel set representing the second mask are calculated.

At block 32, the union between the first mask area and the second mask area is calculated.

In one embodiment, the union of the area of the pixel set representing the first mask area and the area of the pixel set representing the second mask area is calculated.

At block 33, a ratio between the intersection and the union, and obtaining the IoU is calculated.

In one embodiment, the ratio between the intersection and the union is regarded as the IoU.

In one embodiment, the first mask area in the first image and the second mask area in the second image are regarded as the areas of the pixel set, and the area of the pixel set obtained at time t is regarded as a first area, and the area of the pixel set obtained at time (t+1) is regarded as a second area, and the IoU between the first area and the second area is calculated. In one embodiment, the area of the overlapping part (intersection) between the first area and the second area is divided by the area of the merged part (union) between the first area and the second area, and the IoU between the first area and the second area is obtained.

In one embodiment, the positions of the first area and the second area in a pixel coordinate system are respectively represented as $[x_{11}, y_{11}, x_{12}, y_{12}]$, and $[x_{21}, y_{21}, x_{22}, y_{22}]$, where $y_{11}$) represents a coordinate of the upper left corner in the first area, $(x_{12}, y_{12})$ represents the coordinate of the lower right corner in the first area, $(x_{21}, y_{21})$ represents the coordinate of the upper left corner in the second area, and $(x_{22}, y_{22})$ represents the coordinate of the lower right corner in the second area. The coordinate of the upper left corner of the area where the first area and the second area intersect is calculated as follows: $x_2 = \min(x_{12}, x_{22})'y_2 = \min(y_{12}, y_{22})$. The coordinate of the lower right corner of the area where the first area and the second area intersect is calculated as follows: $x_2 = \min(x_{12}, x_{22})'y_2 = \min(y_{12}, y_{22})$.

According to the above the coordinates of the intersection area, an area S1 of the intersection between the first area and the second area is calculated as follows: $S1 = \max((x_2 - x_1 + 1), 0) \cdot \max((y_2 - y_1 + 1), 0)$; the area S11 of the first area is calculated as follows: $S11 = (x_{12} - x_{11} + 1) \cdot (y_{22} - y_{11} + 1)$, the area S22 of the second area is calculated as follows: $S22 = (x_{22} - x_{21} + 1) \cdot (y_{22} - y_{21} + 1)$, the area S2 of the union between the first area and the second area is calculated as follows: $S2 = S11 + S22 - S1$. According to the area S1 of the intersection and the area S2 of the union, the IoU R between the first area and the second area is calculated as follows: $R = S1/S2$.

At block 24, a dynamic class object mask area of the target vehicle is determined whether to generate according to the IoU.

In one embodiment, the dynamic class object mask area refers to a masked area formed by connecting the masked areas of the target vehicle at different times. For example, a vehicle in motion forms the first mask area when the moving vehicle is in the first position at time t, and forms the second mask area when moving vehicle moves to the second position at time (t+1), the mask area formed by connecting the first mask area and the second mask area is regarded as an indication that the vehicle is moving, i.e., the dynamic class object mask area.

In one embodiment, the method determines whether to generate the dynamic class object mask area of the target vehicle based on the IoU. In one embodiment, before determining whether to generate the dynamic class object mask area of the target vehicle, a state of the target vehicle is determined, and the state can include a non-moving state and a moving state. When the state of the target vehicle is the moving state, the first mask area and the second mask area are connected to generate the dynamic class object mask area of the target vehicle; when the state of the target vehicle is the non-moving state, the dynamic class object mask area of the target vehicle is not generated.

FIG. 4 illustrates a flowchart of a method of generating the dynamic class object mask area of the target vehicle. The method can begin at block 41.

At block 41, the IoU between the first mask area and the second mask area is compared with a preset threshold.

In one embodiment, the IoU between the first mask area and the second mask area is between 0 and 1. When the coincidence degree between the first mask area and the second mask area is close to 1, the coincidence degree between the first mask area and the second mask area is high; when the coincidence degree between the first mask area and the second mask area is close to 0, the coincidence degree between the first mask and the second mask area is low. Taking the target vehicle as an example, when the coincidence degree between the first mask area of the target vehicle at time t and the second mask area at time (t+1) is close to 1, then the coincidence degree between the first mask area of the target vehicle at time t and the second mask area at time (t+1) is high. When the coincidence degree between the first mask area of the target vehicle at time t and the second mask area at time (t+1) is close to 0, then the coincidence degree between the first mask area of the target vehicle at time t and the second mask area at time (t+1) is low. In one embodiment, the preset threshold can be set at 0.5, and a certain error can be allowed. For example, the above comparison between the IoU and the preset threshold can be completed by a preset error range combined with the preset threshold.

At block 42, when the IoU between the first mask area and the second mask area is greater than or equal to the preset threshold, the dynamic class object mask area of the target vehicle is generated.

For example, when the coincidence degree between the first mask area of the target vehicle at time t and the second mask area at time (t+1) is greater than or equal to 0.5, then the dynamic class object mask area of the target vehicle is generated.

At block 43, when the IoU between the first mask area and the second mask area is less than the preset threshold, the dynamic class object mask area of the target vehicle is not generated.

For example, when the coincidence degree between the first mask area of the target vehicle at time t and the second mask area at time (t+1) is less than 0.5, then the dynamic class object mask area of the target vehicle is not generated.

At block 25, the target vehicle is a moving vehicle is determined when generating the dynamic class object mask area of the target vehicle.

In one embodiment, when the coincidence degree between the first mask area of the target vehicle at time t and the second mask area at time (t+1) is greater than or equal to 0.5, a dynamic class object mask area of the target vehicle is generated. In one embodiment, the masked area formed by connecting the mask areas of the target vehicle at different times is used as the dynamic class object mask area of the target vehicle, and the target vehicle that causes the generation of a dynamic class object mask area is determined as a moving vehicle.

In one embodiment, a scene is fixed. If there is a moving object during a capturing process of a monocular camera, such as cars and pedestrians, it will lead to an inaccurate calculation of a loss function of the Residual Convolutional Neural Network Model for Monocular Depth Estimation. As the car is moving, a value of the loss function will be very large. For example, a method of semantic segmentation can be used to mask all moving objects when calculating the loss function. Since the semantic segmentation can only provide different categories of objects, in the process of masking the moving objects it is easy to mask stationary objects together with the moving objects, which affects a recognition accuracy.

In the process of a vehicle driving, it is necessary to make accurate judgments on the status of surrounding vehicles and pedestrians. In one embodiment, the instance segmentation technology is used to segment target images and accurately identify each object in the target images, identify the number of the vehicles, the moving vehicles and the non-moving vehicles.

In one embodiment, after determining that the target vehicle is a moving vehicle, a vehicle safety distance model is established, and a safe braking distance between vehicles is obtained based on the vehicle safety distance model. When determining that the distance between the moving vehicle and the vehicle is less than or equal to the safe braking distance, an alarm message is issued. In one embodiment, the alarm message includes a first alarm message and a second alarm message. When the distance between the moving vehicle and the assisted vehicle is equal to the safe braking distance, the first alarm message is issued at a first frequency; when the distance between the moving vehicle and the assisted vehicle is less than the safe braking distance, the second alarm message is issued at a second frequency; wherein the first frequency is less than the second frequency.

In practical applications, the mask area of the moving vehicle is used to accurately determine the distance between the assisted vehicle and the surrounding vehicles/pedestrians, so as to ensure driving safety.

In one embodiment, after determining that the surrounding target vehicles are moving vehicles, the vehicle safety distance model between the surrounding moving vehicles and the assisted vehicle is established.

In one embodiment, according to a speed v1 of the assisted vehicle at time t, the speed v2 of the surrounding vehicles (that is, the target vehicle or vehicles), and a distance between the assisted vehicle and the surrounding vehicles, the vehicle safety distance model is established, and the safety braking distance between the vehicles is obtained based on the vehicle safety distance model.

When the distance between two vehicles is greater than the safe braking distance, the assisted vehicle can drive normally without an alarm message. When the distance between the two vehicles is less than or equal to the safe braking distance, the alarm message is issued to remind the driver that the distance to the surrounding vehicle is too close. When the distance between the moving vehicle and the assisted vehicle is equal to the safe braking distance, the first alarm message is issued at the first frequency, and when the distance between the moving vehicle and the assisted vehicle is less than the safe braking distance, the second alarm message is issued at the second frequency. For example, when it is determined that the distance between the moving vehicle and the assisted vehicle is equal to the safe braking distance, the first alarm message is issued at a frequency of 5 times per minute, and when the distance between the moving vehicle and the assisted vehicle is less than the safe braking distance, the first alarm message is issued at a frequency of 10 times per minute. In one embodiment, when a time for issuing the second alarm message exceeds a preset time, for example, if the driver of the assisted vehicle does not make an attempt to avoid danger within 2 minutes, the automatic emergency braking system is activated to ensure the safety of the assisted vehicle.

In one embodiment, the safe braking distance d can be divided into three different critical distances according to different safety warning forms, such as a critical safety distance, a critical dangerous distance, and a critical infinitely small distance. In one embodiment, different safety warning measures are made according to the distance of the assisted vehicle.

Through the instance segmentation algorithm, the present application can improve the accuracy of identifying the surrounding moving vehicles, and further ensure the monitoring of the safe distance of the assisted vehicle during a driving process.

Referring to FIG. 1, in one embodiment, the storage 11 may be an internal memory of the in-vehicle device 1, that is, a memory built in the in-vehicle device 1. In another embodiment, the storage 11 may also be an external memory of the in-vehicle device 1, that is, a memory externally connected to the in-vehicle device 1.

In one embodiment, the storage 11 is used to store program codes and various data, and to achieve high-speed and automatic access to programs or data during an operation of the vehicle-mounted device 1.

In one embodiment, the storage 11 may include random access memory, and may also include a non-volatile memory, such as a hard disk, an internal memory, a plug-in hard disk, a Smart Media Card (SMC), a Secure Digital (SD)

card, a Flash Card, at least one disk storage device, a flash memory device, or other volatile solid-state storage devices.

In one embodiment, the processor 12 may be a Central Processing Unit (CPU), and may also be a general-purpose processor, a Digital Signal Processors (DSP), an Application Specific Integrated Circuit (ASIC), a Field-Programmable Gate Array (FPGA) or other programmable logic devices, discrete gate or transistor logic devices, discrete hardware components, etc. The processor 12 can be a microprocessor or any conventional processor.

The storage 11 can be used to store the computer program, and the at least one processor 12 implements the computer program stored in the storage 11 and calling up the data stored in the storage 11. The storage 11 may include a stored program area and a stored data area, wherein the stored program area may store an operating system, an application program required for at least one function (such as a sound playback function, an image playback function, etc.), etc. The storage data area may store data (such as audio data) created according to the use of the electronic device 1, etc. In addition, the storage 11 may include non-volatile storage such as a hard disk, an internal memory, a plug-in hard disk, a Smart Media Card (SMC), a Secure Digital (SD) card, a Flash Card (Flash Card), at least one disk storage device, flash memory device, or other non-volatile solid state storage device.

The exemplary embodiments shown and described above are only examples. Even though numerous characteristics and advantages of the present disclosure have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

What is claimed is:

1. A method for identifying moving vehicles comprising:

capturing a first image of a target vehicle at a first time and a second image of the target vehicle at a second time;

determining a first mask area of the target vehicle from the first image, and determining a second mask of the target vehicle from the second image based on an instance segmentation algorithm, wherein the first mask area is an obscured area of the first image determined by obscuring a first object in the first image, and the second mask area is an obscured area of the second image determined by obscuring a second object in the second image;

calculating an Intersection over Union (IoU) between the first mask area and the second mask area;

determining whether to generate a dynamic class object mask area of the target vehicle according to the IoU, wherein the dynamic class object mask area is generated by connecting the first mask area and the second mask area, and the dynamic class object mask area is an indication that the vehicle is moving; and determining that the target vehicle is a moving vehicle if generating the dynamic class object mask area of the target vehicle is determined.

2. The method for identifying moving vehicles as claimed in claim 1, further comprising:

determining a first location of the target vehicle in the first image and an identification of the target vehicle.

3. The method for identifying moving vehicles as claimed in claim 2, further comprising:

determining a second location of the target vehicle in the second image based on the identification of the target vehicle.

4. The method for identifying moving vehicles as claimed in claim 3, further comprising:

inputting the first image into a feature extraction network, and obtaining a first feature map of the first image;

inputting the second image into the feature extraction network, and obtaining a second feature map of the second image;

performing binary classification and coordinate regression on the first feature map and the second feature map, and determining first Regions of Interest (ROIs) of the target vehicle in the first feature map and second ROIs of the target vehicle in the second feature map;

extracting first feature submaps from the first ROIs, and extracting second feature submaps from the first ROIs;

generating the first mask area based on the first feature submaps and the first location;

generating the second mask area based on the second feature submaps and the second location.

5. The method for identifying moving vehicles as claimed in claim 1, further comprising:

calculating a first coincidence degree between the first mask area and the second mask area, wherein the first coincidence degree is an intersection;

calculating a second coincidence degree between the first mask area and the second mask area, wherein the second coincidence degree is a union;

calculating a ratio between the first coincidence degree and the second coincidence degree, and defining the ratio as the IoU.

6. The method for identifying moving vehicles as claimed in claim 1, further comprising:

comparing the IoU between the first mask area and the second mask area with a preset threshold;

when the IoU is greater than or equal to the preset threshold, generating the dynamic class object mask area of the target vehicle; and when the IoU between the first mask area and the second mask area is less than the preset threshold, not generating the dynamic class object mask area of the target vehicle.

7. The method for identifying moving vehicles as claimed in claim 1, further comprising:

establishing a vehicle safety distance model, and determining a safe braking distance between vehicles based on the vehicle safety distance model;

when determining that a distance between the moving vehicle and one vehicle is less than or equal to the safe braking distance, issuing an alarm message.

8. The method for identifying moving vehicles as claimed in claim 7, further comprising:

when the distance between the moving vehicle and the vehicle is equal to the safe braking distance, issuing a first alarm message at a first frequency;

when the distance between the moving vehicle and the vehicle is less than the safe braking distance, issuing the second alarm message at a second frequency, wherein the first frequency is less than the second frequency.

9. An in-vehicle device comprising:

a processor; and a non-transitory storage medium coupled to the processor and configured to store a plurality of instructions, which cause the processor to:

capture a first image of a target vehicle at a first time and a second image of the target vehicle at a second time;

determine a first mask area of the target vehicle from the first image, and determine a second mask of the target vehicle from the second image based on an instance segmentation algorithm, wherein the first mask area is an obscured area of the first image determined by obscuring a first object in the first image, and the second mask area is an obscured area of the second image determined by obscuring a second object in the second image;

calculate an Intersection over Union (IoU) between the first mask area and the second mask area;

determine whether to generate a dynamic class object mask area of the target vehicle according to the IoU, wherein the dynamic class object mask area is generated by connecting the first mask area and the second mask area, and the dynamic class object mask area is an indication that the vehicle is moving;

determine that the target vehicle is a moving vehicle if generating the dynamic class object mask area of the target vehicle is determined.

10. The in-vehicle device as claimed in claim 9, wherein the plurality of instructions are further configured to cause the processor to:

determine a first location of the target vehicle in the first image and an identification of the target vehicle.

11. The in-vehicle device as claimed in claim 10, wherein the plurality of instructions are further configured to cause the processor to:

determine a second location of the target vehicle in the second image based on the identification of the target vehicle.

12. The in-vehicle device as claimed in claim 11, wherein the plurality of instructions are further configured to cause the processor to:

input the first image into a feature extraction network, and obtain a first feature map of the first image;

input the second image into the feature extraction network, and obtain a second feature map of the second image;

perform binary classification and coordinate regression on the first feature map and the second feature map, and determine first Regions of Interest (ROIs) of the target vehicle in the first feature map and second ROIs of the target vehicle in the second feature map;

extract first feature submaps from the first ROIs, and extract second feature submaps from the first ROIs;

generate the first mask area based on the first feature submaps and the first location;

generate the second mask area based on the second feature submaps and the second location.

13. The in-vehicle device as claimed in claim 9, wherein the plurality of instructions are further configured to cause the processor to:

calculate a first coincidence degree between the first mask area and the second mask area, wherein the first coincidence degree is an intersection;

calculate a second coincidence degree between the first mask area and the second mask area, wherein the second coincidence degree is a union;

calculate a ratio between the first coincidence degree and the second coincidence degree, and define the ratio as the IoU.

14. The in-vehicle device as claimed in claim 9, wherein the plurality of instructions are further configured to cause the processor to:

compare the IoU between the first mask area and the second mask area with a preset threshold;

when the IoU is greater than or equal to the preset threshold, generate the dynamic class object mask area of the target vehicle;

when the IoU between the first mask area and the second mask area is less than the preset threshold, fail to generate the dynamic class object mask area of the target vehicle.

15. The in-vehicle device as claimed in claim 9, wherein the plurality of instructions are further configured to cause the processor to:

establish a vehicle safety distance model, and determining a safe braking distance between vehicles based on the vehicle safety distance model;

when determining that a distance between the moving vehicle and one vehicle is less than or equal to the safe braking distance, issue an alarm message.

16. The in-vehicle device as claimed in claim 15, wherein the plurality of instructions are further configured to cause the processor to:

when the distance between the moving vehicle and the vehicle is equal to the safe braking distance, issue a first alarm message at a first frequency;

when the distance between the moving vehicle and the vehicle is less than the safe braking distance, issue the second alarm message at a second frequency, wherein the first frequency is less than the second frequency.

17. A non-transitory storage medium having stored thereon instructions that, when executed by at least one processor of an in-vehicle device, causes the least one processor to execute instructions of a method for identifying moving vehicles, the method comprising:

capturing a first image of a target vehicle at a first time and a second image of the target vehicle at a second time;

determining a first mask area of the target vehicle from the first image, and determining a second mask of the target vehicle from the second image based on an instance segmentation algorithm, wherein the first mask area is an obscured area of the first image determined by obscuring a first object in the first image, and the second mask area is an obscured area of the second image determined by obscuring a second object in the second image;

calculating an Intersection over Union (IoU) between the first mask area and the second mask area;

determining whether to generate a dynamic class object mask area of the target vehicle according to the IoU, wherein the dynamic class object mask area is generated by connecting the first mask area and the second mask area, and the dynamic class object mask area is an indication that the vehicle is moving;

determining that the target vehicle is a moving vehicle of generating the dynamic class object mask area of the target vehicle is determined.

18. The non-transitory storage medium as recited in claim 17, wherein the method comprising:

determining a first location of the target vehicle in the first image and an identification of the target vehicle.

19. The non-transitory storage medium as recited in claim 18, wherein the method comprising:

determining a second location of the target vehicle in the second image based on the identification of the target vehicle.

20. The non-transitory storage medium as recited in claim 19, wherein the method comprising:

inputting the first image into a feature extraction network, and obtaining a first feature map of the first image;

inputting the second image into the feature extraction network, and obtaining a second feature map of the second image;

performing binary classification and coordinate regression on the first feature map and the second feature map, and determining first Regions of Interest (ROIs) of the target vehicle in the first feature map and second ROIs of the target vehicle in the second feature map;

extracting first feature submaps from the first ROIs, and extracting second feature submaps from the first ROIs;

generating the first mask area based on the first feature submaps and the first location;

generating the second mask area based on the second feature submaps and the second location.

* * * * *